Feb. 16, 1965  F. HURTH  3,169,447
GEAR FINISHING TOOL HAVING HUNTING TOOTH ACTION AND
A PLURALITY OF ZONES EACH WITH HELICALLY
ARRANGED CUTTING EDGES
Filed Dec. 11, 1961  3 Sheets-Sheet 1
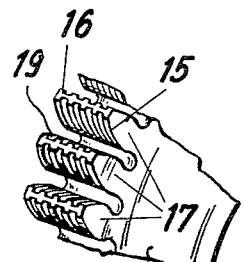
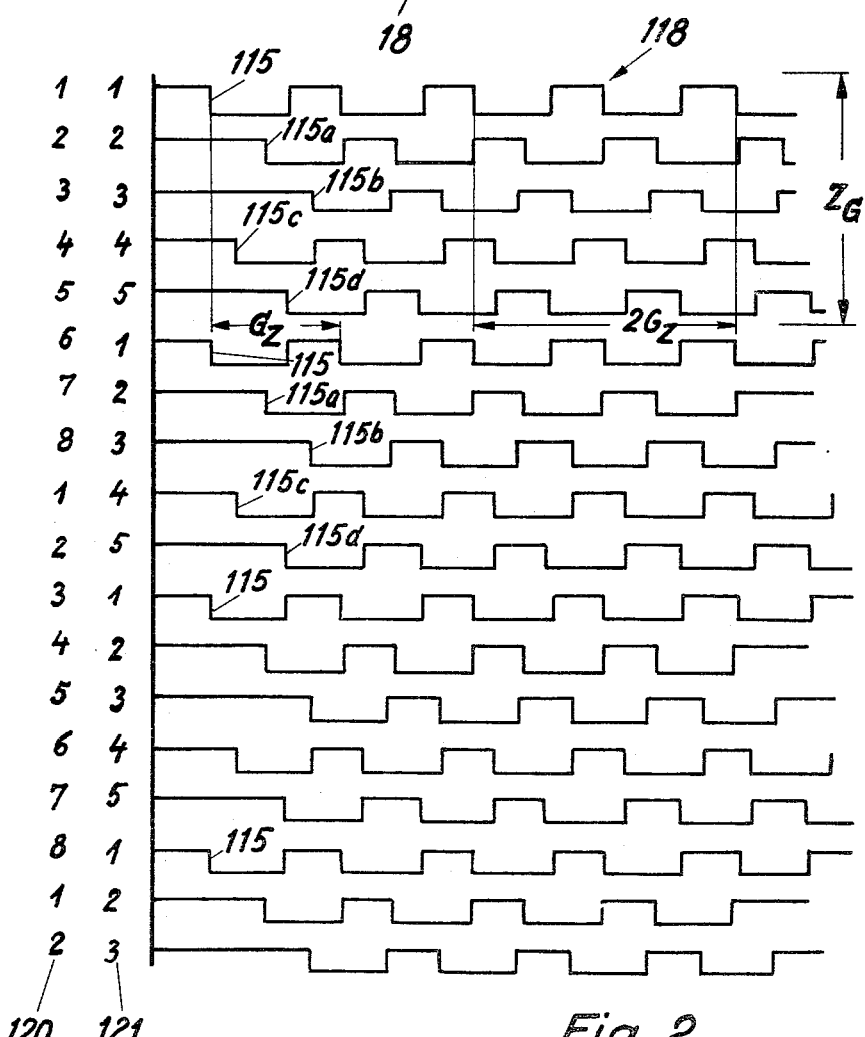
INVENTOR:
FRITZ HURTH
BY
Michael S. Striker
ATTORNEY 3,169,447
GEAR FINISHING TOOL HAVING HUNTING TOOTH ACTION AND A PLURALITY OF ZONES EACH WITH HELICALLY ARRANGED CUTTING EDGES
Fritz Hurth, Munich-Solln, Germany, assignor to Carl Hurth Maschinen- und Zahnradfabrik, Munich, Germany
Filed Dec. 11, 1961, Ser. No. 158,407
Claims priority, application Germany, Dec. 12, 1960, H 41,201
15 Claims. (Cl. 90—1.6)

The present invention relates to gear finishing tools in general, and more particularly to a gear shaped shaving tool for toothed gears and like workpieces.

Before proceeding with the enumeration of various objects which the present invention aims to attain, I will now shortly outline the construction and the mode of operation of certain shaving tools of which I am aware at this time and which belong to the general class of tools including the tools constructed in accordance with my invention.

Generally, the cutting edges on the serrated teeth of known shaving tools are arranged in planes which are parallel with the central plane of the tool, i.e. with a plane which is perpendicular to the tool axis. If the tool runs in mesh with a workpiece in conventional manner, i.e. with the axis of the tool crossing in space the axis of the workpiece, such crossed-axes mounting of the tool and the workpiece causes the cutting edges to perform a sliding movement along the faces of the teeth on the workpiece so that each cutting edge produces an inclined cut along the face and flank surface on that particular tooth of the workpiece with which it is in momentary mesh. As a rule, provision is made for additional movement between the workpiece and the tool, i.e. for a translatory axial movement of the tool with respect to the workpiece, to make sure that the inclined cuts made by the cutting edges are close to each other whereby, after a number of such translatory movements, a smoothly finished tooth face on the workpiece may be obtained.

It is also known to arrange the cutting edges on consecutive teeth of the shaving tool in the form of a helix. Such arrangement prevents or reduces the likelihood of formation of cutter marks. The helically arranged cutting edges are intended to insure uniform shaving action in all zones of the tooth faces on the workpiece even if no translatory axial movement between the workpiece and the tool takes place. However, a serious drawback of such known shaving tools is that no provision is made for a definite relationship between the teeth of the workpiece and the teeth of the shaving tool.

As a rule, the provision of helically arranged cutting edges is of lesser importance on shaving tools which perform translatory movements with respect to the workpiece or vice versa since such translatory movements may be controlled in a sense to make sure that all zones of tooth faces on the workpiece are shaved with a considerable degree of uniformity. The situation is different in machines which shave workpieces without translatory movement between the workpiece and the shaving tool. As a rule, the shaving operation in such machines is carried out by gradually reducing the distance between the axes of the tool and the workpiece until the shaving operation is completed or, alternately, the workpiece or the tool is displaced in one direction transversely of its axis while the axial distance between the tool and the workpiece remains unchanged. Such operation is less accurate and requires complicated mechanisms for effecting necessary movements of the tool and/or the workpiece.

While it is true that a workpiece may be shaved to obtain a reasonably satisfactory surface finish by utilizing conventional shaving tools with helically arranged cutting edges if the workpiece and the shaving tool are maintained in mesh for a considerable period of time, the time necessary for satisfactory shaving operation cannot be calculated in advance and is frequently very long so that the output of the machine is not satisfactory for a mass-manufacturing operation. Also, such conventional shaving tools with helically arranged cutting edges do not insure a controlled progress of the shaving action if one decides to select an arbitrary value for the number of cutting edges on each tooth, for the lead of helices in which the cutting edges are arranged around the shaving tool, for the total number of teeth on the shaving tool and/or for the total number of teeth on the workpiece. In such instances, it is unavoidable that certain tooth faces of the workpiece are shaved more frequently than the remaining tooth faces, i.e. that more material is removed from one or more tooth faces than from the remaining tooth faces of the work, and also that the shaving action is not uniform in all zones of a given tooth face on the workpiece. Thus, it is unavoidable that, as the shaving operation progresses, any abrupt interruption of helical paths defined by the cutting edges causes an interruption in the shaving action. Clearly, such operation cannot produce satisfactory results excepting in some isolated instances and if the faces of teeth on the workpiece are moved again and again into meshing engagement with the serrated teeth of the shaving tool in a time-consuming and hence uneconomical operation.

Accordingly, it is an important object of the present invention to provide a shaving tool which is constructed and whereon the number of teeth is correlated with the number of teeth on the workpiece in such a way that it produces an inherently uniform shaving action with mathematical regularity.

Another object of the invention is to provide a shaving tool of the just outlined characteristics which can produce a highly satisfactory shaving action within much shorter periods of time, i.e. with a lesser number of meshing engagements between its teeth and the teeth of the workpiece, than the known shaving tools of which I am aware at this time.

A further object of the invention is to provide a shaving tool of the above outlined character whose cutting edges will uniformly remove material from all zones of the tooth faces on a workpiece.

A concomitant object of the instant invention is to provide a shaving tool which will produce a highly satisfactory shaving action even in the absence of translatory movement between the tool and the workpiece.

Still another object of the invention is to provide a shaving tool of the above outlined characteristics wherein the overall number of teeth or at least a certain number of serrated teeth is in a definite optimum relationship with the number of teeth on the workpiece.

An additional object of the invention is to provide a gear shaving tool which will produce a highly satisfactory shaving action even if one or more of its teeth are without serrations and even if one or more of its teeth are formed with cutting edges which are not arranged in a helical pattern around the tool.

With the above objects in view, the invention resides in the provision of a gear finishing or shaving tool wherein the overall number of serrated teeth has a specific relationship with the number of teeth on the workpiece, i.e. the tool comprises a predetermined number of teeth at least some of which form one or more groups of preferably consecutively arranged teeth whose faces are formed with serrations providing cutting edges and the cutting edges of the consecutive teeth embraced in this groups are axially staggered with respect to each other so as to form one or more helices around the shaving tool. The ratio of the number of teeth on the workpiece to the number of teeth in the aforementioned groups is such that, in accordance with a preferred embodiment of my invention, the face on a selected tooth of the workpiece comes into renewed engagement with the cutting edges on a given tooth of the tool after all other teeth of the workpiece having been in finishing engagement with an equivalent cutting edge. By equivalent cutting edge I am talking of the same cutting edge in the same group as of a cutting edge which is arranged on a tooth with the same number in another group. In accordance with another embodiment of my invention, the tool may comprise teeth arranged in one or more groups having cutting edges arranged in a manner as outlined hereinabove and one or more additional teeth which may but need not be serrated.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a fragmentary perspective view of a gear finishing tool which embodies one form of my invention;

FIG. 2 is a fragmentary schematic developed plan view illustrating the arrangement of cutting edges on the teeth of a gear finishing tool having a total number of teeth which is a whole-number multiple of five;

Figure 3:
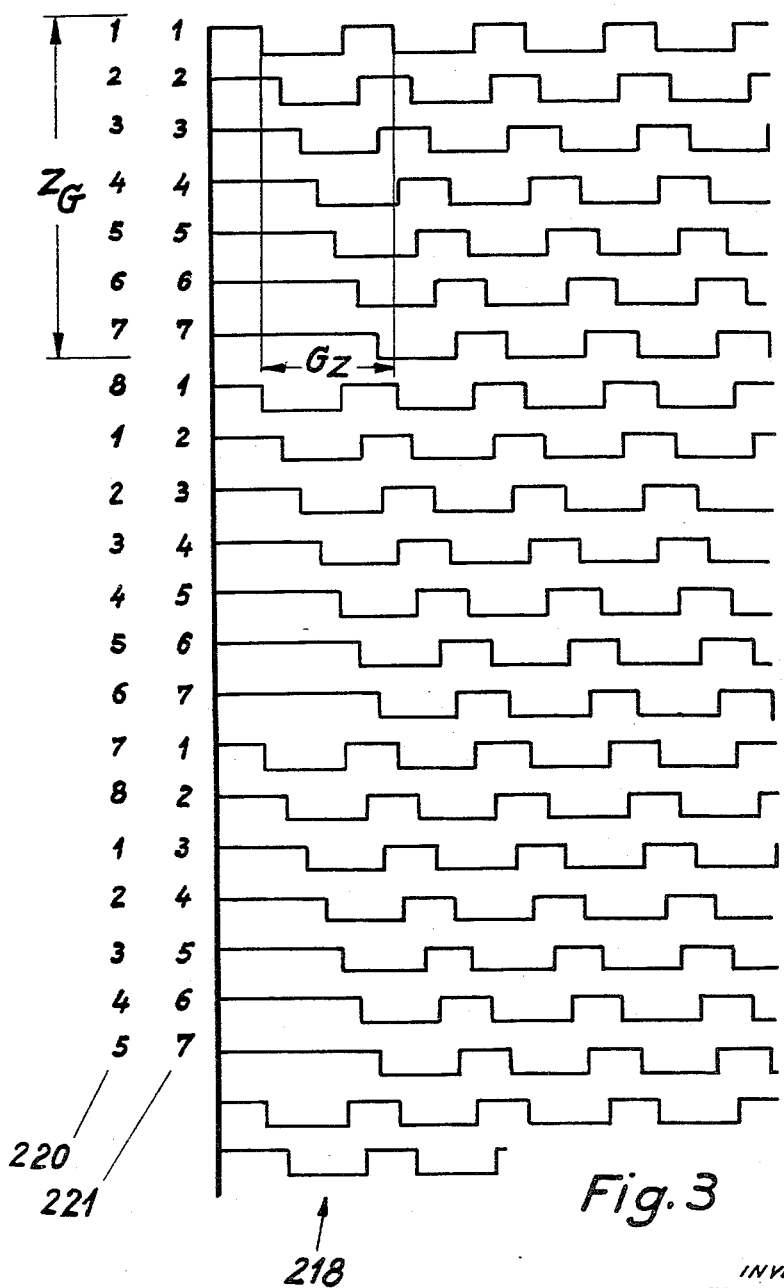
FIG. 3 is a similar fragmentary developed plan view of a modified gear finishing tool having a total number of teeth which is a whole-number multiple of seven.

Referring to FIG. 1, there is shown a gear shaped finishing or shaving tool 18 having serrated teeth 17 whose faces are provided with uniformly spaced parallel grooves 19 extending up and down between the roots and top lands 16 of these teeth so that the lateral walls of the grooves 19 and the faces of the respective teeth define between themselves a plurality of cutting edges 15.

FIG. 2 is a fragmentary developed view of a tool 118 which is assumed to have a number $Z_G$ of teeth e.g. five, to cover the dimension $2 \cdot G_Z$. The number of teeth on the tool is a whole-number multiple of the number $Z_G$. $Z_G$ is hereinafter referred to as group. Only one face on each tooth of the tool 118 is shown in FIG. 2, and the first cutting edges on the consecutive teeth numbered 1–5 (column 121) are identified by reference numerals 115–115d. The left-hand column 120 of numerals 1–8, 1–8, 1, 2 . . . represents symbolically the teeth of a gear shaped workpiece which is assumed to have eight teeth, i.e. the number of teeth (8) on the workpiece 120 is divisible with a rest (3) by the number $Z_G$ of teeth (5) on the tool 118. It can also be said that the number of teeth on the workpiece and the number of teeth of the group $Z_G$ on the tool do not have a common divisor, or that the number of teeth on the workpiece is not a whole-number multiple of the number of teeth of the group $Z_G$ on the tool. It is assumed that the teeth of the workpiece 120 revolve and are brought into repeated mesh with the teeth of the tool 118, and that the axis of the tool crosses in space the axis of the workpiece. Such crossed-axes arrangement produces a relative sliding movement between the faces of the meshing teeth. As explained hereinbefore, the extent of such relative sliding movement may be increased by providing for translatory movement of the tool with respect to the workpiece or vice versa. However, in the absence of such relative translatory movement, the cutting edges on the consecutive teeth of the tool 118 must be staggered in the axial direction of the tool in order to make sure that all zones of the faces on the teeth of the workpiece are shaved to the same extent without cutting marks.

By comparing the right- and left-hand columns 121, 120 of numerals in FIG. 2, one will note that the first tooth (1) of the workpiece will come into mesh with the first, fourth, second, fifth, third and again with the first tooth of group $Z_G$ on the tool when the two components rotate and are in meshing engagement with each other. In other words, the cutting edges 115 of the tooth 1 on the tool 118 come into renewed shaving engagement with the face on the first tooth 1 of the workpiece 120 only after the face on the first tooth 1 of the workpiece was shavingly engaged by the cutting edges (115a–115d) on all remaining teeth 2–5 of the group $Z_G$ on the tool. It can also be said that the face on a given tooth of the workpiece comes into renewed engagement with the cutting edges on the first tooth of the tool after having been shavingly engaged by the second, third, fourth and fifth teeth of the group $Z_G$ but not necessarily in this order.

The cutting edges of consecutive teeth 1–5 on the tool 118 of FIG. 2 are axially staggered with respect to each other in such a way that they form helices or spirals with a lead of $2G_Z$ wherein $G_Z$ indicates the axial distance between two adjacent cutting edges on a tooth of the tool, i.e. the lead of the helices formed by the axially staggered cutting edges on consecutive teeth 1–5 of the group $Z_G$ is a whole-number multiple of the axial distance between two adjacent cutting edges on a tooth forming part of the shaving tool, and in the embodiment of FIG. 2 this whole number is two.

It will be noted that, while the tool 118 completes a revolution corresponding to $Z_G$, the first five teeth of the workpiece 120 are engaged by the first cutting edges 115–115d on the respective teeth of the tool at axially staggered points whose axial distance is less than $G_Z$.

The diagram of FIG. 2 shows that the first cutting edge 115 on the first tooth 1 of the group of the tool 118 consecutively shaves the faces on the first, sixth, third and eighth tooth of the workpiece 120. The progression is continued (in a manner not shown in the left-hand column of FIG. 2) in such sequence that the first cutting edge on the first tooth of group $Z_G$ thereupon consecutively engages the fifth, second, seventh and fourth tooth of the workpiece 120, i.e. the cutting edges on the first tooth of the group come into shaving engagement with the faces on the teeth 2–8 of the workpiece 120 before coming into renewed shaving engagement with the tooth 1 of the workpiece. The cycle is then repeated in the same sequence, i.e. the tooth 1 of the tool 118 comes into shaving engagement with the teeth 1, 6, 3, 8, 5, 2, 7 and 4 of the workpiece in this order.

If the teeth of the tool 118 were arranged in the order in which they contact the face on a selected tooth (e.g. 1) of the workpiece 120, i.e. in the sequence 1, 4, 2, 5, 3, the first cutting edges 115–115d of these teeth would form a helix with the axial distance between the first cutting edges on the teeth 1, 4 equal to the axial distance between the first cutting edges on the teeth 4, 2, with the axial distance between the first cutting edges on the teeth 4, 2 equal to the axial distance between the first cutting edges on the teeth 2, 5, and so forth. Thus, the resulting helix follows a double-thread pattern of the cutting edges as shown in FIG. 2. However, the arrangement of cutting edges acting within the axial distance $G_Z$ need not be exactly the same as shown in FIG. 2.

FIG. 3 illustrates another preferred embodiment of my invention according to which the number of teeth (left-hand column) on the workpiece 220 exceeds by one the number $Z_G$ of teeth (right-hand column 221) on the tool 218, i.e. the workpiece and the groups on the tool are respectively assumed to be provided with eight and seven teeth. In other words, the number of cutting edges acting along the dimension $G_Z$ is one less than the number of teeth on the workpiece. The cutting edges on the tooth 1 of the tool 218 consecutively shave the faces on the teeth 1, 8, 7, 6, 5, 4, 3, 2 of the workpiece, that is, the first tooth (1) of the workpiece 220 is consecutively shaved by the cutting edges on the teeth 1, 2, 3, 4, 5, 6, 7 of the tool 118. By expressing the relationship in a different way, within the axial distance $G_Z$ the first tooth of the workpiece 220 will be consecutively engaged by the first cutting edges on teeth 1, 2, 3, 4, 5, 6, 7 of the tool 218. The advantage of the arrangement shown in FIG. 3 is that the progression continues in steps of one. The cutting edges on the consecutive teeth of the tool 118 produce a helix with a single-thread pattern.

The number $Z_G$ of teeth on the tool 218 (seven in FIG. 3) may be changed to exceed by one the number of teeth on the workpiece, i.e. if the workpiece comprises say eight teeth, the shaving tool may have groups of nine teeth. In other words, the shaving operation will be equally satisfactory if the overall number of teeth on the workpiece exceeds by one the number of teeth in one group on the tool, or vice versa.

Figure 4:
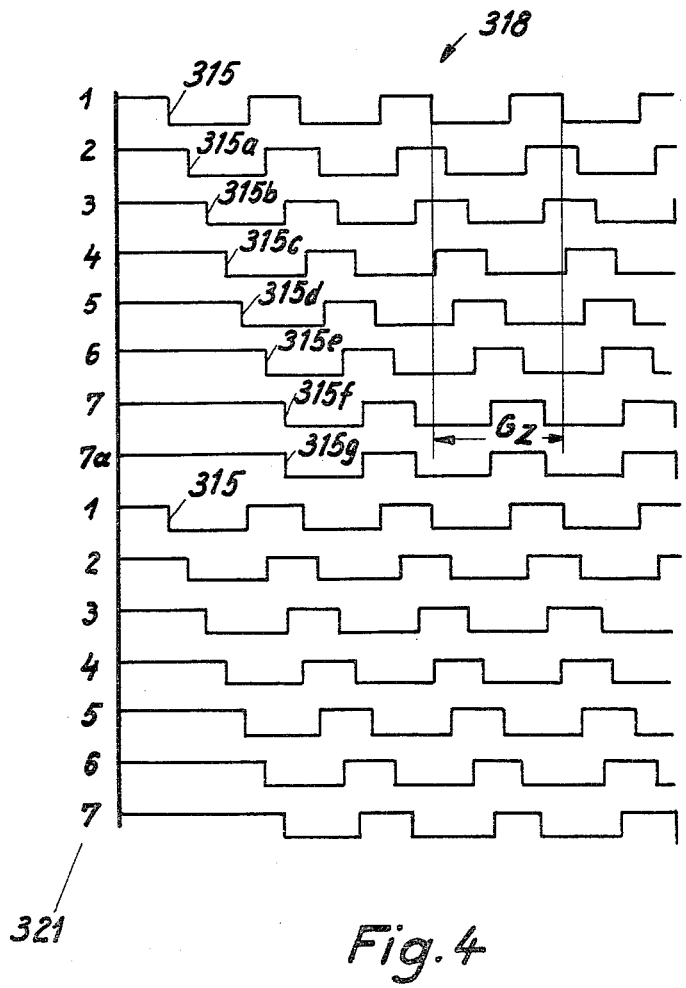
FIG. 4 is a further fragmentary schematic developed plan view of a gear finishing tool which is formed with a total number of teeth which is other than a whole-number of eight.

FIG. 4 illustrates a further modification of my invention according to which one group of teeth on the tool 318 comprises eight teeth including a group of teeth 1-7 (column 321) whose faces are formed with cutting edges 315–315f in the same manner as described in connection with FIG. 3, and an additional tooth 7a whose cutting edges 315g are coplanar with the cutting edges of the seventh or last tooth in the group 1-7 of teeth on the tool 318. Of course, if desired, one or even more additional teeth may be provided between two or more other groups. Also, it is equally possible to provide a second additional tooth after the tooth 7a, and each additional tooth may be formed with smooth faces, i.e. without any serrations and hence without any cutting edges.

The construction of FIG. 4 is of considerable advantage by meeting certain workshop requirements where only limited indexing equipment is available for machining the grooves on the teeth of shaving tools. For example, if the number of shaving tool teeth required in accordance with the embodiments of FIGS. 2 and 3 would be 96 but the available indexing device is such that the tool must be formed with 97 teeth, one of the teeth on the shaving tool will be formed with cutting edges corresponding to those on the tooth 7a of FIG. 4, or this one tooth will be left with smooth faces. In other words, the 97th tooth of the shaving tool will be formed with cutting edges which are coplanar with the respective cutting edges of the 96th tooth, or the 97th tooth will be without serrations.

The tools of my invention are equally useful for shaving of externally or internally toothed workpieces.

It will be noted that, in the embodiment of FIG. 4, the group of teeth (1-7) which are formed with cutting edges arranged in accordance with my invention is one less than the number (8) of teeth on the cutting tool 318. On the other hand, in the embodiments of FIGS. 2 and 3 the group of teeth formed with helically arranged cutting edges equals the number $Z_G$ of teeth on the respective tool. The lead of the helices in which the cutting edges of the teeth 1-5 in FIG. 2, 1-7 in FIG. 3 or 1-7 in FIG. 3 are arranged is always a whole-number multiple of the distance $G_Z$, and this whole number may be one (FIG. 3 or 4), two (FIG. 2), or higher. In other words, the lead of helices formed by the cutting edges on the teeth of the tool 218 or 318 equals the distance $G_Z$.

In summation, it can be said that, depending on the workpiece to be shaved and the machines available for making the shaving tools therefor, the following types of shaving tools are embraced by the scope of my invention:

(I) Shaving tools having teeth whereon the cutting edges are arranged exclusively along helical paths in a manner as shown in FIGS. 2 and 3.

(II) Shaving tools having teeth on which the cutting edges are arranged in helices and which have one or more additional teeth without cutting edges or wherein one or more additional teeth have cutting edges which are coplanar with the respective cutting edges on a tooth forming part of the group with helically arranged cutting edges (FIG. 4). The overall effect of such shaving tools is the same as that of the shaving tools shown in FIGS. 2 and 3, i.e. a given tooth face on the workpiece does not come into engagement with the cutting edges on a given tooth of the tool until after the faces on all other teeth of the workpiece were engaged by the given tooth of the tool. In this type of shaving tools, the cutting edges on the additional tooth or teeth (if provided) of the tool may but need not be taken into consideration.

(III) Shaving tools having teeth on which the cutting edges are arranged in one or more helical paths and which include one or more teeth without serrations or with cutting edges partially or fully aligned with the cutting edges of an adjacent serrated tooth belonging to the group of teeth with helically arranged cutting edges. The overall effect of such shaving tools is not exactly the same as that described in paragraphs (I) and (II) above since the faces on the teeth of the workpiece may move repeatedly into effective engagement with the cutting edges on a given tooth of the shaving tool. However, here too, after a given number of revolutions performed by the workpiece, all zones of tooth faces on the workpiece have been in effective engagement with the cutting edges of the shaving tool.

A shaving operation with the tool of my invention is carried out in the same way as with conventional shaving tools, i.e. of such tools whose teeth are formed with cutting edges located in planes perpendicular to the tool axis but not arranged in helical paths as described above in connection with FIGS. 2-4. The tool is preferably caused to perform a small translatory movement after each revolution of the workpiece. However, while the shaving action of conventional tools exhibits the drawbacks which were outlined hereinabove, the shaving action of the improved tool is inherently uniform and removes shavings with mathematical regularity. If the workpiece is one of considerable axial length, translatory movements between the tool and the workpiece are not necessary if the sides of the teeth on the shaving tool are provided with longitudinally arched concave surfaces.

As stated before, the grooves and cutting edges of consecutive serrated teeth on the workpiece are arranged in the form of helices, but some deviations from this general rule are possible in order to compensate for the effects of vibration or for some other reasons as long as the basic concept of my invention remains embodied in the shaving tool. Also, while the drawings illustrate shaving tools with cutting edges arranged in the form of helices having a lead $G_Z$ or $2G_Z$, the lead may also equal $3G_Z$ which would mean that the cutting edges of consecutive teeth on the shaving tool would follow triple helical paths.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is.

1. In a method of shaving a gear like workpiece having a predetermined number of teeth, the steps of bringing the workpiece in meshing engagement with a rotary shaving tool having several groups of teeth provided with uniformly spaced parallel cutting edges extending up and down between the roots and top lands thereof and forming with each other helices having a lead which is a whole multiple of the distance between two adjoining cutting edges on a tooth, the ratio between the number of teeth in a group and said predetermined number being such that one of said numbers is divisible with a rest by the other number, and rotating said tool to shave the workpiece whereby the face on any given tooth of the workpiece comes in renewed engagement with the cutting edges of a selected tooth in any one of said groups after all other teeth of the workpiece were treated by the cutting edges of a tooth whereon the cutting edges are arranged in the same way as on said selected tooth.

2. A gear shaped tool for finishing the faces of gear like workpieces having a predetermined number of teeth, said tool comprising a plurality of teeth including at least one group of teeth embracing at least some of said plurality of teeth, the teeth forming a group having serrated faces formed with uniformly spaced parallel cutting edges extending up and down between the roots and top lands thereof, the cutting edges of teeth forming a group being arranged in the form of at least one helix and the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in a group after all other teeth of the workpiece were treated by the cutting edges of a tooth whereon the cutting edges are arranged in the same way as on said selected tooth.

3. A gear shaped tool for finishing the faces of gear like workpieces having a predetermined number of teeth, said tool comprising a plurality of teeth including a plurality of groups of teeth together embracing at least some of said plurality of teeth, the teeth in each of said groups having serrated faces formed with uniformly spaced parallel cutting edges extending up and down between the roots and top lands thereof, the cutting edges of teeth in each of said groups being arranged in the form of at least one helix and the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in any one of said groups after all other teeth of the workpiece were treated by the cutting edges of a tooth whereon the cutting edges are arranged in the same way as on said selected tooth.

4. A gear shaped tool for finishing the faces of gear like workpieces having a predetermined number of teeth, said tool comprising a plurality of teeth including at least one group of consecutive teeth embracing at least some of said plurality of teeth and at least one additional tooth, the teeth forming a group having serrated faces formed with uniformly spaced parallel cutting edges extending up and down between the roots and top lands thereof, the cutting edges of teeth forming a group being arranged in the form of at least one helix and the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in a group afer all other teeth of the workpiece were treated by the cutting edges of a tooth whereon the cutting edges are arranged in the same way as on said selected tooth, said additional tooth having smooth faces.

5. A gear shaped tool for finishing the faces of gear like workpieces having a predetermined number of teeth, said tool comprising a plurality of teeth including at least one group of consecutive teeth embracing at least some of said plurality of teeth and at least one additional tooth, the teeth forming a group having serrated faces formed with uniformly spaced parallel cutting edges extending up and down between the roots and top lands thereof, the cutting edges of teeth forming a group being arranged in the form of at least one helix and the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in a group after all other teeth of the workpiece were treated by the cutting edges of a tooth whereon the cutting edges are arranged in the same way as on said selected tooth, said additional tooth having uniformly spaced cutting edges extending up and down between the roots and top lands thereof and the position of said last mentioned cutting edges with reference to the cutting edges on the teeth of a group being different from the relative position of cutting edges on the teeth of a group.

6. A tool as set forth in claim 5, wherein the cutting edges of said additional tooth are coplannar with the cutting edges of the last consecutive tooth of the teeth forming a group.

7. A gear shaped tool for finishing the faces of gear like workpieces having a predetermined number of teeth, said tool comprising a plurality of teeth including at least one group of teeth embracing at least some of said plurality of teeth, the teeth forming a group having serrated faces formed with uniformly spaced parallel cutting edges extending up and down between the roots and top lands thereof, the cutting edges of teeth forming a group being arranged in the form of at least one helix and the lead of said helix being equal to a whole multiple of the distance between a pair of adjacent cutting edges on the face of a tooth, the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in a group after all other teeth of the workpiece were treated by the cutting edges of a tooth whereon the cutting edges are arranged in the same way as on said selected tooth.

8. A gear shaped tool for finishing the faces of gear like workpieces having a predetermined number of teeth, said tool comprising a plurality of teeth including at least one group of teeth embracing at least some of said plurality of teeth, the teeth forming a group having serrated faces formed with uniformly spaced parallel cutting edges extending up and down between the roots and top lands thereof, the cutting edges of teeth forming a group being arranged in the form of at least one helix and the lead of said helix being equal to a whole multiple of the distance between a pair of adjacent cutting edges on the face of a tooth, the ratio between the number of teeth forming a group and the number of teeth on the workpiece to be treated in response to meshing engagement with and rotation of said tool being such that the face of a given tooth of the workpiece comes into renewed engagement with the cutting edges of a selected tooth in a group after all other teeth of the workpiece were treated by the cutting edges of a tooth whereon the cutting edges are arranged in the same way as on said selected tooth.

9. A gear shaped tool for finishing the faces of gear like workpieces having a predetermined number of teeth, comprising a plurality of teeth including a plurality of groups of teeth embracing at least some of said plurality of teeth and the ratio between the number of teeth in a group and said predetermined number being such that one of said numbers is divisible with a rest by the other number, the teeth in each of said groups having serrated faces formed with uniformly spaced parallel cutting edges extending up and down between the roots and top lands thereof, the cutting edges of teeth in each of said groups being arranged in the form of at least one helix so that the face of a given tooth of the workpiece to be treated in response to meshing engagement with and rotation of said tool comes into renewed engagement with the cutting edges of a selected tooth in any one of said groups after all other teeth of the workpiece were treated by the cutting edges of a tooth whereon the cutting edges are arranged in the same way as on said selected tooth.

10. A tool as set forth in claim 9, wherein the number of teeth in a group is divisible with a rest by said predetermined number.

11. A tool as set forth in claim 9, wherein the lead of said helix is a whole-number multiple of the distance between a pair of adjacent cutting edges on the face of a tooth.

12. A tool as set forth in claim 9, wherein said predetermined number is divisible with a rest by the number of teeth in a group.

13. A combination as set forth in claim 12, wherein said rest equals one.

14. A combination as set forth in claim 12, wherein said rest equals one and the lead of said helix is a whole-number multiple of the distance between a pair of adjacent cutting edges on the face of a tooth.

15. A combination as set forth in claim 14, wherein said

References Cited by the Examiner
UNITED STATES PATENTS

| | | | |
|---|---|---|---|
| 2,328,783 | 9/43 | Christman | 90—1.6 |
| 2,329,284 | 9/43 | Mentley | 29—103 |
| 2,356,868 | 8/44 | Miller | 29—103 |

ANDREW R. JUHASZ, *Primary Examiner.*

LEON PEAR, *Examiner.*